United States Patent [19]

Murray

[11] Patent Number: 4,658,434
[45] Date of Patent: Apr. 14, 1987

[54] LAMINATES AND LAMINATED ARTICLES

[75] Inventor: Eric S. A. Murray, Beecroft, Australia

[73] Assignee: Grain Security Foundation Ltd., Randwick, Australia

[21] Appl. No.: 867,961

[22] Filed: May 29, 1986

[51] Int. Cl.⁴ .................... B65D 33/16; B32B 1/02; B32B 15/08; B32B 27/08
[52] U.S. Cl. ...................................... 383/66; 383/80; 428/35; 428/461; 428/516
[58] Field of Search .................. 383/66, 80; 428/35, 428/215, 216, 461, 516

[56] References Cited

U.S. PATENT DOCUMENTS

| | | | |
|---|---|---|---|
| 4,513,050 | 4/1985 | Akao | 428/516 |
| 4,532,189 | 7/1985 | Mueller | 428/516 |
| 4,576,844 | 3/1986 | Murray et al. | 428/35 |
| 4,588,621 | 5/1986 | Bunel et al. | 428/35 |
| 4,590,126 | 5/1986 | Andersson | 428/35 |
| 4,605,576 | 8/1986 | Jabarin | 428/516 |

Primary Examiner—William J. Van Balen
Attorney, Agent, or Firm—Brady, O'Boyle & Gates

[57] ABSTRACT

A laminate having a first layer of heat sealable plastics material, a second layer of high density plastics, a third layer of high density plastics cross-laminated to the second layer, a fourth layer of foil and a fifth layer of plastics material. A sack or container is also disclosed, which sack or container is formed from the aforesaid laminate.

5 Claims, 6 Drawing Figures

LAMINATES AND LAMINATED ARTICLES

This invention relates to laminates and to laminated articles and more particularly to sacks or like containers made from laminates, which containers might be useful for storage of grain and like products.

A serious problem faces subsistence farmers throughout the world in the storage of grains secure from insects, moisture and rodents from one harvest to the next. Stored in traditional containers, especially in tropical environments such grain is rotten with insects etc, within a few weeks.

In order to have edible grain for family consumption and to have viable seed for sowing the next crop, subsistence farmers, at least in tropical and sub-tropical climates, conventionally sell their grain at the harvest. At this time, of course, prices are at their lowest. Such people normally retain about eight weeks domestic supply. Eventually such people buy back from merchants grain which they themselves had grown, at considerably elevated prices. For example a price increase of 60% for domestic consumption grain and up to 400% for seed grain is not atypical.

Clearly a requirement exists for a container which might be used by subsistence and other type grain farmers to store grain for extended periods. It is contemplated that any such container might be formed of a laminated structure and it is an object of this invention to provide such a laminate and a container formed therefrom.

This invention in one broad form provides a laminate comprising a first layer of plastics material any two regions of which are readily heat sealable to each other, a second layer of high density plastics material, a third layer also of high density plastics material cross-laminated to said second layer, a fourth layer of foil or like material adapted to minimise gas transmission therethrough and a fifth layer of plastics material.

This invention in a further broad form provides a laminate having a first layer of low density polyethylene, second and third layers of high density polyethylene, said second and third layers being cross-laminated together, a fourth layer of aluminium film and a final layer of low density polyethylene.

The structural strength of the above defined laminate is derived from the cross-lamination of the said two sheets of high density polyethylene. The first sheet of low density polyethylene provides a means of heat sealing portions of the laminate to form a sack or container and also reduces the permeability of the laminate itself. The aluminium film layer minimises gas transmission through the laminate and the final layer of low density polyethylene further reduces permeability and assists in heat sealing of the container portions formed from this laminate, as well as reducing the tendency of sacks formed from this laminate to slip when stacked one on top of each other.

The invention in a further broad form provides a sack or container formed from either of the above defined laminates said container having shoulders sloping to the mouth thereof, being heat seamed and being sealable either by a purpose made polyethylene screw-cap or by heat sealing with a hot iron across the top opening thereof.

A container as defined above is gas-tight and moisture-proof. It is hermetically sealed. Grain contained within such a sealed container, by natural transpiration, consumes the oxygen in the inter-granular air space and gives off carbon dioxide. The reduction of oxygen within the container and the increase in the level of carbon dioxide have the effect of bringing insect activity to zero and in due course to kill all insects contained therein. Since such container is moisture proof, and the grain which is admitted to any such container has been dried before being stored, moulds or fungi cannot develop.

It is further believed that containers of this invention will be substantially resistant to rodents and birds, which creatures spoil traditionally stored grain.

By way of example only one example of a laminate according to this invention together with two examples of containers formed from the laminate of this invention will now be described with reference to the accompanying drawings wherein.

Figure 3:
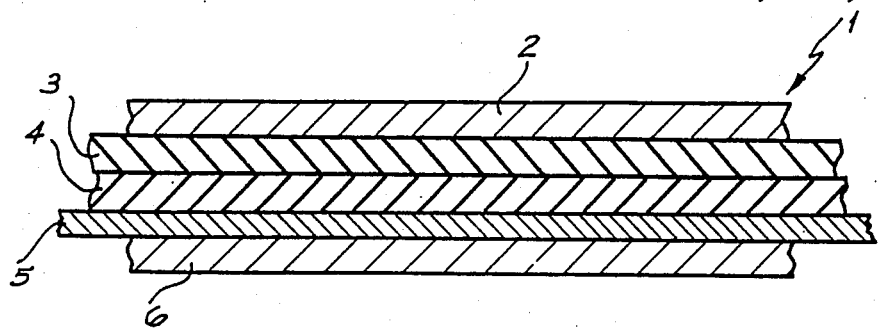
FIG. 3 is a section of a laminate according to this invention.

Laminate 1 (FIG. 3) is constituted by a first layer 2 of low density polyethylene. Layers 3 and 4, each of high density polyethylene are cross-laminated together to provide strength to the laminate. Aluminium foil layer 5 is next provided and laminate 1 is completed by final layer 6 of low density polyethylene.

Figure 1:
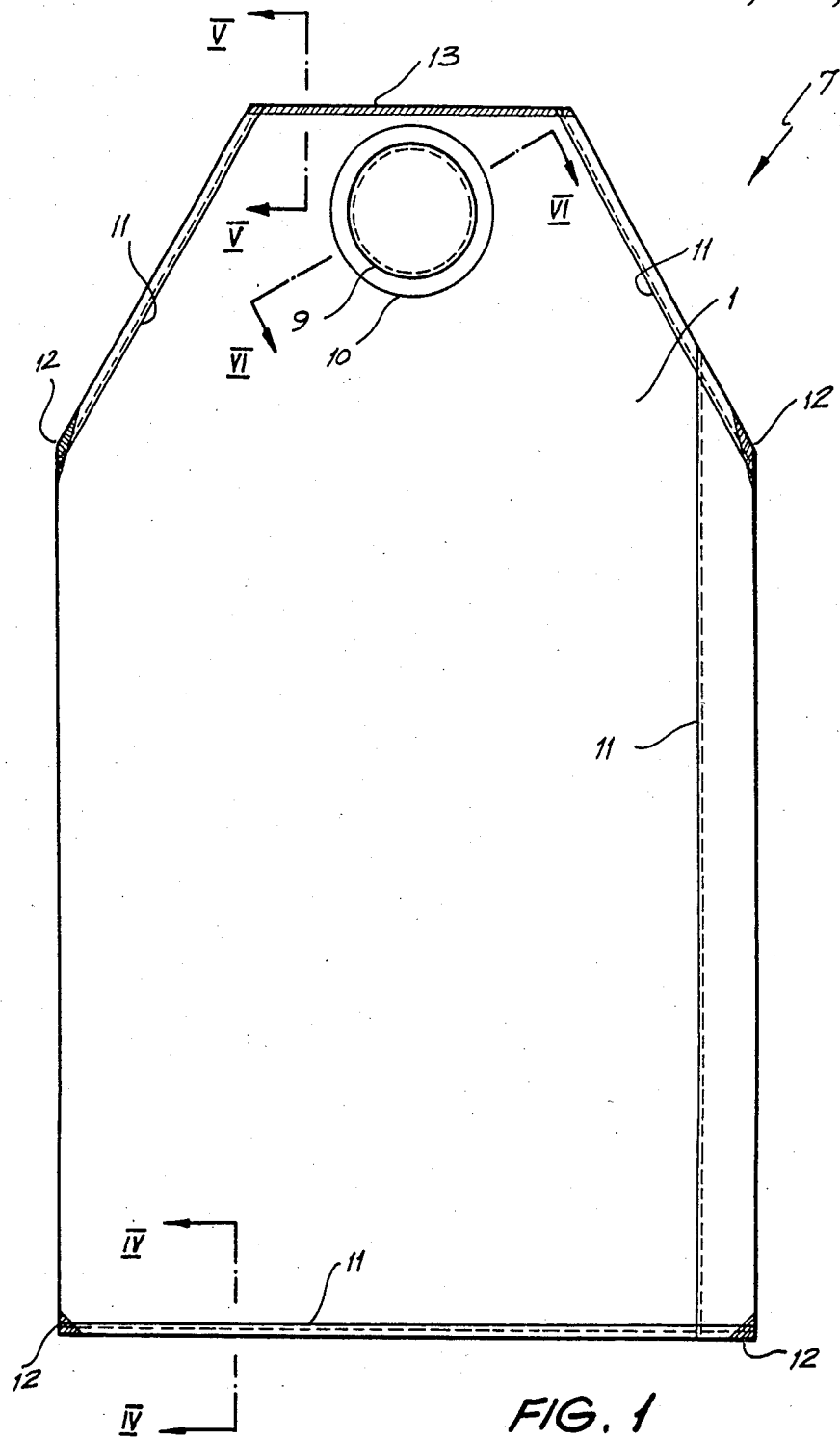
FIG. 1 is a front view of a first embodiment of a laminated container according to this invention.
Figure 2:
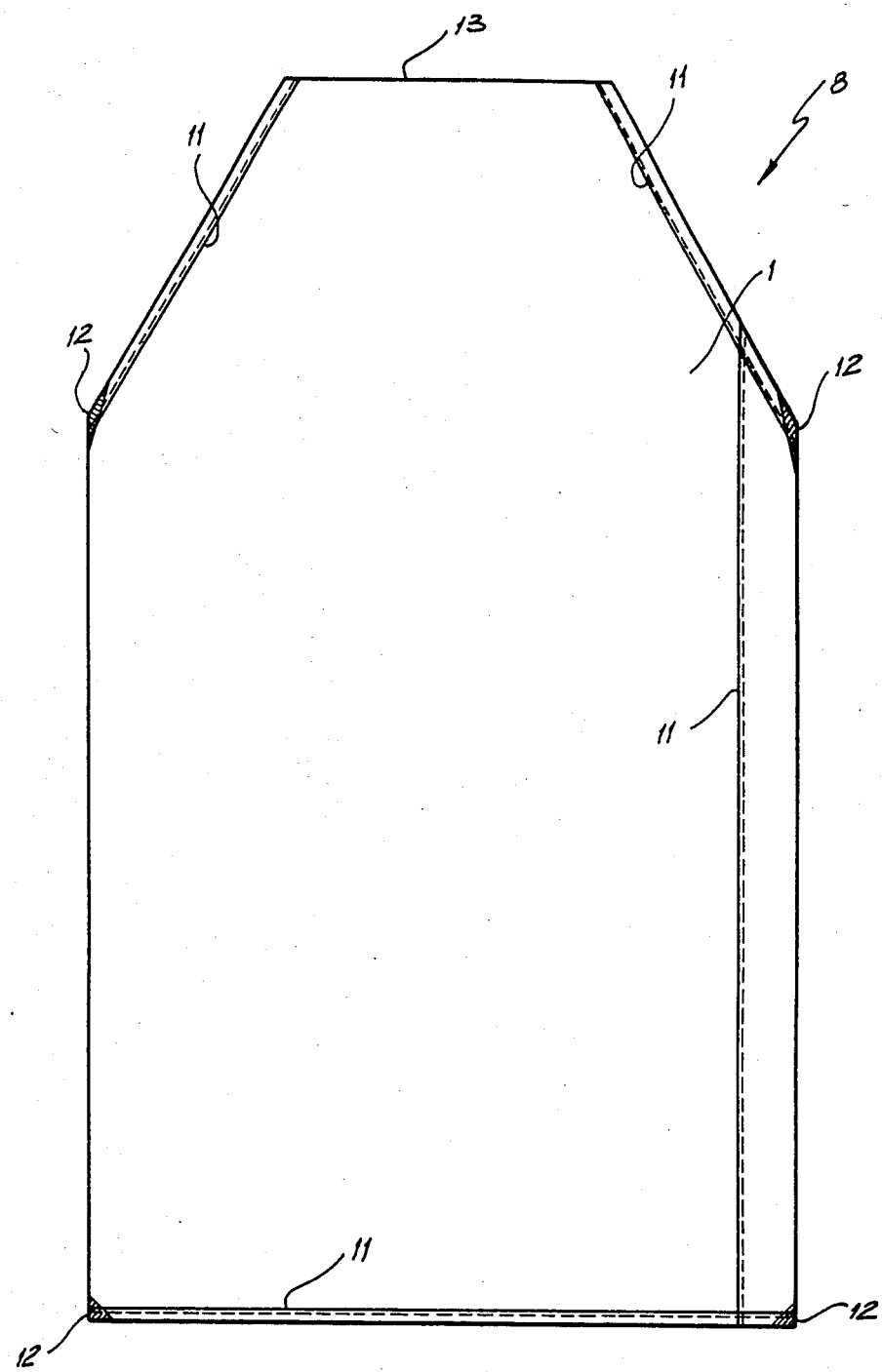
FIG. 2 is a front view of a second embodiment of a laminated container according to this invention.
Figure 4:
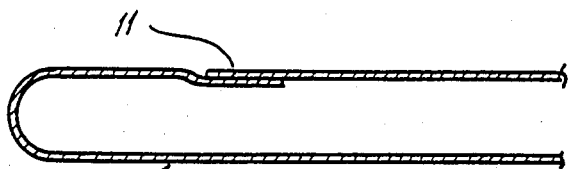
FIG. 4 is a section on the line IV—IV of FIG. 1 showing an overlap weld.
Figure 5:
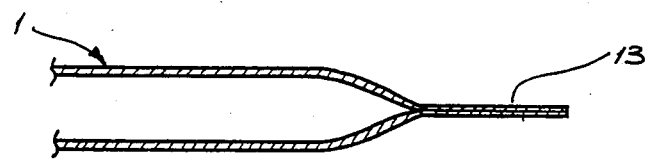
FIG. 5 is a section on the line V—V of FIG. 1 showing the pinch welded neck of container 7.
Figure 6:
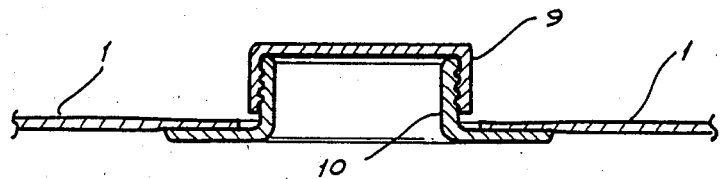
FIG. 6 is a section on the line VI—VI of FIG. 1 showing the screw cap 9 applied.

Lengths of laminate 1 are used for forming containers 7 and 8 of FIGS. 1 and 2 respectively. Containers 7 and 8 are each formed by folding a predetermined length of laminate 1 back on itself and providing overlap welds 11 (FIG. 4) at the base and shoulders of each container and by pinch welding at corners 12 of respective containers 7 and 8 and at neck 13 of container 7. Screw cap 9 is provided to seal container 7 whereas the neck 13 of container 8 is left open at point of sale for heat sealing after filling. This heat sealing may be effected by draining a hot iron or like device across the open neck 13 of container 8, melting a strip of layer 2 of laminate 1 and pressing this molten strip against a remaining portion of layer 2 of laminate 1 and pressing this molten strip against a remaining portion of layer 2 of laminate 1, until sealing is effected.

It will be appreciated that when the heat sealed neck of container 8 is opened, the seam is sacrificed and the height of container 8 shortened. However, it is contemplated that approximately nine such seaming and opening procedures can occur without the grain storage volume of container 8 being substantially reduced.

The laminate of this invention can be seen to lend itself to the formulation of acceptable containers useful in the storage of grain, particularly in subsistence farming communities.

What I claim is:

1. A laminate comprising a first layer of plastics material any two regions of which are readily heat sealable to each other;

a second layer of a high density plastics material;

a third layer also of a high density plastics material, said second and third layers being cross-laminated to each other;

a fourth layer of foil or like material adapted to minimise gas transmission therethrough; and a fifth layer of plastics material.

2. A laminate as defined in claim 1 wherein said first layer is of low density polyethylene, said second and third layers are of high density polyethylene, said fourth layer is of aluminium foil and said fifth layer is of low density polyethylene.

3. A container formed from the laminate of claim 1 or claim 2, said container having shoulders sloping to the mouth thereof, leaving heat seamed and being sealable either by a purpose made cap or by heat sealing across the top opening thereof.

4. A container as defined in claim 3 wherein said cap is a screw cap of polyethylene.

5. A container as defined in claim 3 wherein heat seaming of edges is by overlap welding and wherein corners of said container are pinch welded.

* * * * *